Jan. 1, 1952      M. C. MORLEY      2,580,814
WINDOW WIPER
Filed Aug. 3, 1946      2 SHEETS—SHEET 1
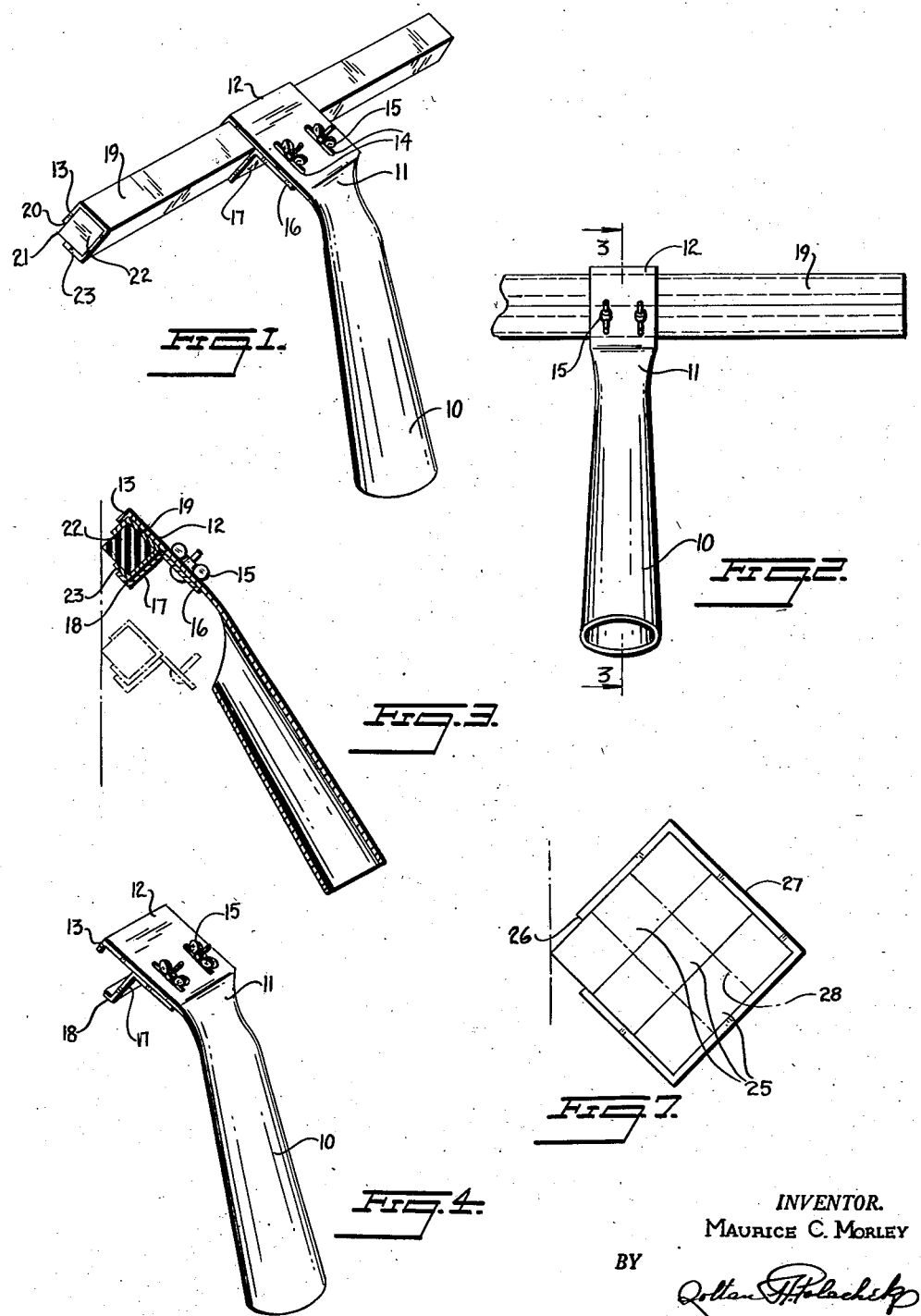
INVENTOR.
MAURICE C. MORLEY
BY
ATTORNEY

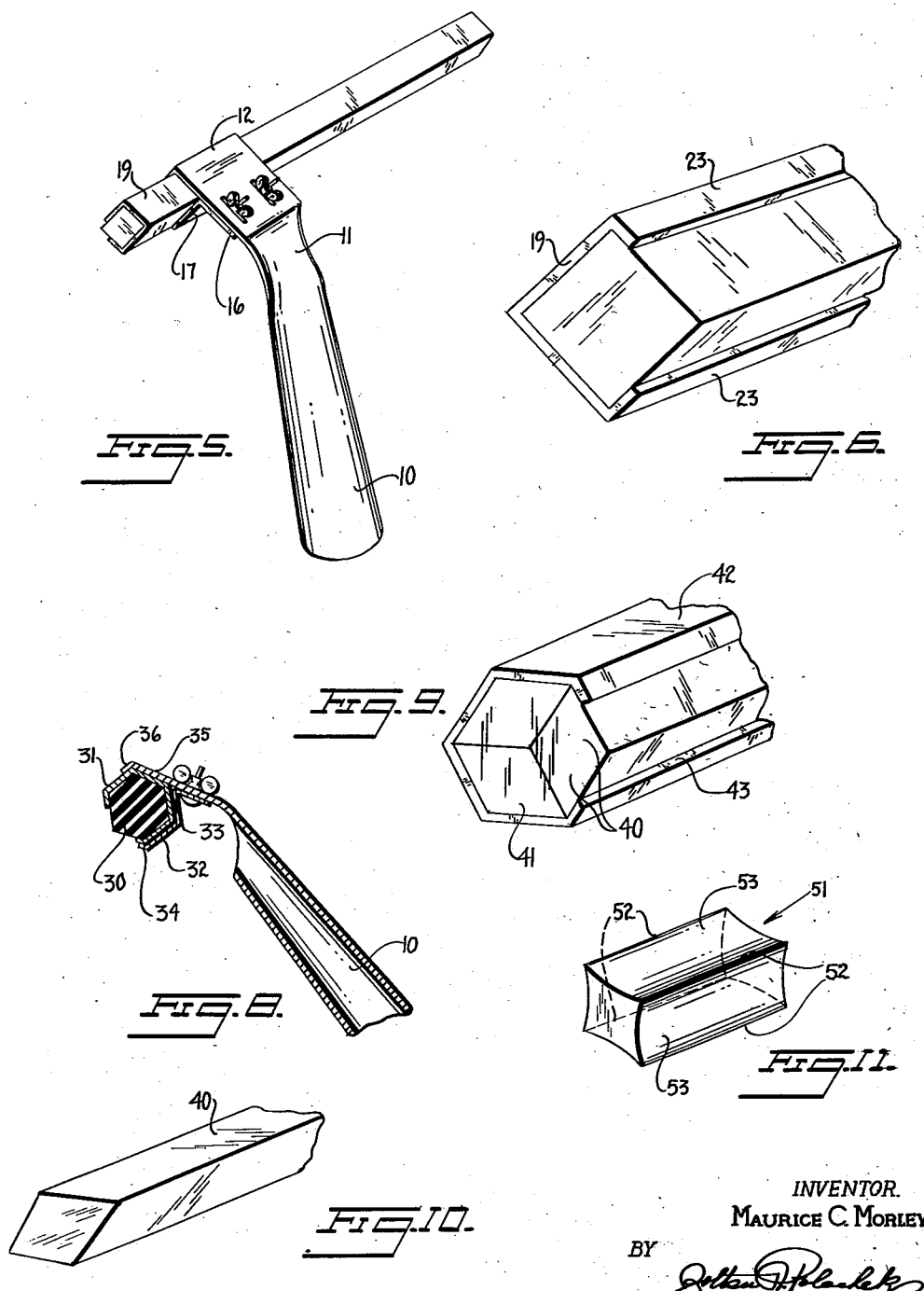

Patented Jan. 1, 1952

2,580,814

UNITED STATES PATENT OFFICE 2,580,814

WINDOW WIPER

Maurice C. Morley, Brooklyn, N. Y.

Application August 3, 1946, Serial No. 688,290

1 Claim. (Cl. 15—245)

This invention relates to a window wiper and in particular to the type known as a squeegee.

A particular object of the invention is to provide in a window wiper of the type referred to, a rubber wiping strip of such cross sectional shape that four or more wiping edges are available for successive use. The rubber wiping strips employed in present squeegees present two wiping edges and as the edges wear down rapidly, the constant renewal of the strips is expensive, due to the time necessary for replacement.

It is a further object of my invention to provide a window wiper in which rubber strips of rectangular or triangular shape may be employed in connection with a mounting for the same or holder that will facilitate interposition of the working edges of the strip.

Still further objects of the invention are to provide a simplified structure in which a tubular casing is mounted in a handle that may be adjustably positioned any point along the length of the casing, the handle and the casing being made narrow to permit use in crowded places as when the squeegee must be used on windows which have bars through which the squeegee must be inserted for use; to provide a casing for the strips having a longitudinal corner opening and one that will securely hold the strips in any useable arrangement; and to provide a device that is simple in structure, efficient in operation, and can be made at a minimum cost.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a view in perspective of a window wiper constructed in accordance with the invention.

Fig. 2 is a partial rear view of the window wiper illustrated in Fig. 1.

Fig. 3 is a section on the line 3—3 of Fig. 2 showing, diagrammatically, the wiper in use.

Fig. 4 is a view in perspective of the handle member of the wiper.

Fig. 5 is a view in perspective similar to Fig. 1, showing the location of the handle adjacent one end of the wiper casing.

Fig. 6 is a fragmentary view in perspective, showing the open side or corner of the strip holding casing.

Fig. 7 is an end view of a modified form of the wiping member showing the use of a plurality of strips and possible arangements thereof within the holder.

Fig. 8 is a view similar to Fig. 3, showing a modified form of wiper strip of hexagonal shape in cross section.

Fig. 9 is a fragmentary view in perspective, similar to Fig. 6, but showing a nested arrangement of wiping strips of rhombic shape in cross section.

Fig. 10 is a fragmentary view in perspective of one of the rubber strips employed in the type of holder illustrated in Fig. 9, showing the cross sectional shape thereof.

Fig. 11 is a perspective view of still another modified wiping member.

Referring to the drawings in detail, 10 indicates a hollow tubular handle which may be slightly tapered to form a convenient direct hand hold or which may be slipped over the end of a long handle. The upper end 11 of the handle 10 is extended to provide a flat clamp arm 12, having a turned over flange 13. The clamp arm 12 adjacent the upper end of the handle is provided with slots 14 for adjustably receiving the wing nut and bolt combinations 15 which pass through a portion 16 of a clamp jaw 17, the latter of which is provided with an edge flange 18.

The clamping coaction of the jaw 17 and the clamping arm 12 grip and hold a tubular casing 19 which is substantially square in cross section and one corner of which as at 20, is left open to permit exposure of the wiping corner 21 of a rubber strip or bar 22 which is also square in cross section and is slidably mounted in the casing 19. As shown in Fig. 6, the casing 19 may have its open side as wide as desired by reducing the width of the sides or flanges 23, the width of said open side depending upon the shape and construction of the rubber strip or bar 22 that is held in the casing.

In Fig. 7, a modified form of rubber wiping element is shown which consists of a plurality of flat rubber strips 25, which are of such thickness that they cannot slide through the opening 26 of the tubular casing 27. As indicated in outline at 28, the position of the strips 25 can be reversed as the edges thereof become worn and in this particular instance, thirty-six edges are available for use as wipers. Instead of the rectangular rubber bar or strip 22, I may provide one of hexagonal shape in cross section as at 30 (Fig. 8) in which event the cross sectional shape of the tubular casing 31 will be substantially hexagonal and the clamp jaw 32 will be provided with a ridge 33 and a flange 34 to fit over one side of the casing 31 to jam the latter against the clamp arm 35 and its edge flange 36.

As illustrated in Fig. 5, the handle 10 may be positioned at any point along the length of the casing so that the casing of the implement may be used in narrow places or to reach out-of-the-way parts of a window. For replacement of the wiping strip or bar, it is simply necessary to loosen bolts 15 to relieve pressure on the clamp jaw and arm, which in turn will relieve the clamping pressure on the tubular casing 19.

In Figs. 9 and 10, a further modified form of wiping strip 40 is illustrated which is of a suitable shape in cross section so that three of these strips may be nested in hexagonal shape as at 41 to be held within the casing 42 which is of hexagonal shape in cross section and open at one side as at 43 to expose the edge of one of the strips 40. In this construction, substantially six wiping edges are available and it is evident that, by loosening the clamp screws 15, the strips 40 may be slid endwise out of the casing 42 for change of position.

In Fig. 11, a modified wiping member 51 is long in proportion to its thickness and has four straight, parallel working or wiping edges 52 and four similar concaved faces 53 between the edges 52. When positioned in a suitable holder in which it can be interchangeably positioned, each edge 52 can be exposed alternately for use. The concavity of the intervening faces 53 results in an efficient sharper edge and can be made to provide working edges of any desired thickness and flexibility.

It is evident therefore, that the invention contemplates the use of a slotted tubular casing which may act as a longitudinal clamp to securely hold the wiping strip therein and which may be manipulated in the manner of a squeegee by the use of a handle 10 for clamping engagement at any point along the length of the casing.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent, is:

In a window wiper having a handle, a flat clamping arm continuing from the top end of said handle and in turn continuing along its free top edge into a flange directed at right angles to said clamp arm, a jaw extending parallel to said flange with one edge abutting said clamp arm and continuing at its other edge into a flange extended parallel to said clamp arm and cooperating with said clamp arm and its flange to form a clamp for a tubular casing, said clamping arm and said jaw being of uniform width, a tubular casing longitudinally slidably engaged in the clamp formed by said clamp arm and its flange, said casing being of a length considerably greater than the width of said clamping arm and said jaw, said casing having a corner between the adjacent edges of said flanges cutaway forming an opening extending the length of said tubular casing, an elongated rubber strip in said tubular casing and having an edge exposed beyond the edges of said casing defining its opening, said jaw having a right angularly extended portion along its said one edge engaged flat against said handle, said right angularly extended portion having spaced holes, said handle having elongated slots aligned with said holes and clamp bolts engaged through said aligned holes and slots securing said jaw to said handle, said slots having their lengths extended at right angles to said casing so that when said bolts are loosened said jaw can be moved away from said flat clamping arm and its flange freeing said casing to be slid longitudinally relative to said clamp.

MAURICE C. MORLEY.

REFERENCES CITED

The following references are of record in the file of this patent:

UNITED STATES PATENTS

| Number | Name | Date |
| --- | --- | --- |
| 756,768 | Ziegler | Apr. 5, 1904 |
| 936,460 | Lawlor | Oct. 12, 1909 |
| 970,563 | Schwalen | Sept. 20, 1910 |
| 1,214,247 | Wescott | Jan. 30, 1917 |
| 1,283,175 | Heller | Oct. 29, 1918 |
| 1,362,801 | Johnson | Dec. 21, 1920 |
| 1,980,254 | Cartwright | Nov. 13, 1934 |
| 2,083,551 | Balinger | June 15, 1937 |
| 2,123,638 | Steccone | July 12, 1938 |

FOREIGN PATENTS

| Number | Country | Date |
| --- | --- | --- |
| 57,446 | Norway | Jan. 4, 1937 |